July 23, 1963 W. R. MICKS 3,098,723
NOVEL STRUCTURAL COMPOSITE MATERIAL
Filed Jan. 18, 1960
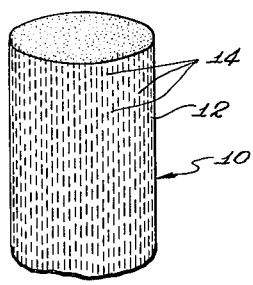
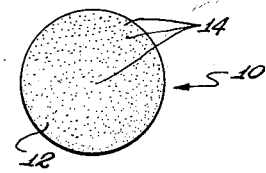
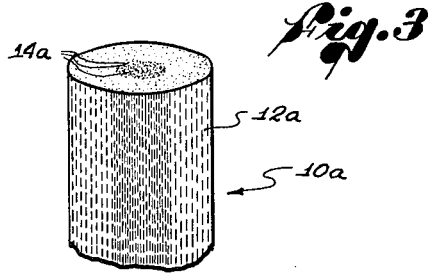
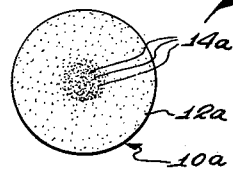
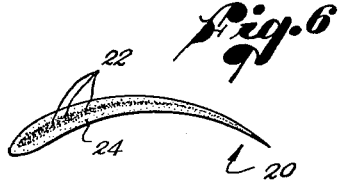
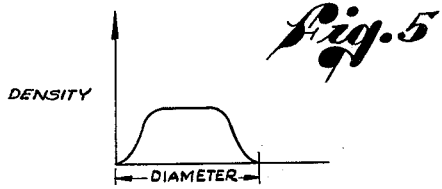
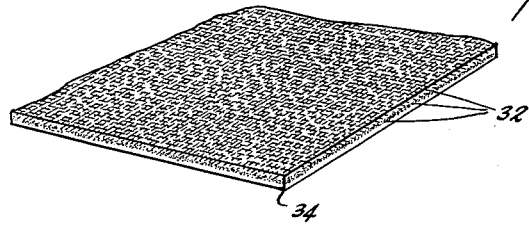
INVENTOR.
WILLIAM R. MICKS
BY Fulwider Mattingly Huntley
Attorneys

United States Patent Office 3,098,723
Patented July 23, 1963

3,098,723
NOVEL STRUCTURAL COMPOSITE MATERIAL
William R. Micks, Woodland Hills, Calif., assignor to The Rand Corporation, Santa Monica, Calif., a nonprofit corporation of California
Filed Jan. 18, 1960, Ser. No. 3,197
1 Claim. (Cl. 29—183.5)

This invention relates generally to the production of novel types of structural composite materials having increased allowable temperatures of operation and increased length of useful life, and having other improved operating characteristics, as well.

In order to improve the performance capability of various flight vehicles, chemical and nuclear powerplants, and various structural components, the allowable operating temperatures of the various components of such structures must be increased. Among the present chief limitations on the useful life of structural materials, e.g. steel, is the phenomenon that their good room-temperature ductility results in poor elevated-temperature strength. The converse is also true—one property is only improved at the expense of another.

The term "ductility" is defined, for purposes of this patent application as follows: when permanent (plastic) deformation can be detected in the crystal structure of a material prior to fracture, the material is said to have ductility; on the other hand, when the deformation of the crystal structure of a material is caused, as by tensile stress, and permanent deformation is not detectable prior to fracture, the material is said to be brittle. Thus, the amount of permanent deformation of a material, without fracture, is generally a measure of ductility of the material.

It is believed that the explanation for the fact that materials having good room-temperature ductility tends to result in poor elevated-temperature strength is substantially as follows. The ductility of a material is greatly affected by its crystal structure. It is well established that ductility results, to a great extent, from "slip" of individual crystals on many closely spaced planes, these planes generally representing planes of the closest packing of atoms. These "slip" or "deformation" mechanisms become increasingly active as the temperature is raised, and finally the increase in activity allows creep to take place, even at very low stresses. At this point, the material lacks "strength" or is "too weak" to transmit forces satisfactorily.

(The "strength" of a material is generally thought of as a resistance to deformation and/or failure of a material subjected to a specified type of loading. Strength may thus be defined in several different ways. In a uniaxial tensile test, for example, "strength" is thought of as the resistance of the material to being pulled apart and strength is measured by the tensile load carried by the material at failure.)

Thus, for example, present steel alloy turbine blades, subjected to severe tensile stresses, are limited in their operation to temperatures of below about 2000° F. due to the creep or deformation of the steel alloy at the elevated temperatures of operation, and consequent loss in strength.

At the present time there is not, to my knowledge, any other material which retains its high strength at elevated temperatures, in the neighborhood of 3000° F. or higher, while possessing ductile characteristics, both at low temperatures, e.g. 50° F., and also at such high temperatures.

Ceramic materials have been studied for some years now, for use as a primary structural material because of their excellent high temperature strength properties, and because some ceramics are actually stronger than metals in compression. However, they have very little ductility at room temperature, that is to say, they are classified as brittle materials. At elevated temperatures, e.g. 2000° F., the brittleness in ceramic materials is somewhat reduced. However, to make practical structural use of such materials, their brittleness must be reduced very substantially, especially in the lower temperature regions.

Various metals such as beryllium, tungsten, etc. and their alloys have very advantageous strength properties at elevated temperatures (as opposed to common metal alloys such as stainless steel, aluminum, magnesium, titanium, etc. which lose strength, or even melt, at temperatures encountered in gas turbines, high speed aircraft, and missiles). However, beryllium, tungsten, and many other high strength refractories are, at present, not practically usable in such high temperature environments because of their brittleness at nominal temperatures. Attempts to improve the ductility of the refractory metals, such as tungsten, or beryllium, have not been successful on a large scale. Various metallurgical treatments, e.g. heat treatment or hot or cold working have not produced the ductility required for general structural use.

Glass is yet another material which is normally brittle, but which becomes ductile at elevated temperatures. However, glass is actually classified as an undercooled liquid (at room temperature) and undergoes continuous softening as the temperature is increased. At high temperatures glass is unsuitable because of its flow characteristics. Composite materials consisting of glass fibres embedded in various more ductile materials, such as copper, or stainless steel, are unsatisfactory because the use of glass sharply limits the upper end of the useful temperature range for these products well below 2000° F.

Composite materials consisting of a plastic and fiberglass are also limited in strength and temperature application by both the plastic and glass components.

Attempts to overcome the brittleness of ceramic materials have not met with too much success. For example, ceramic materials have been mixed with a less brittle metal to produce so-called "cermets." The lack of success of the cermets appears to be due to the fact that the metallic component has not been utilized in the best possible manner. Thus, if a ceramic body has many approximately spheroidal unconnected pieces of metal embedded in it, any plastic deformation of the metal particles inherently requires a similar plastic deformation in the surrounding ceramic material, which is not possible at nominal temperatures. Thus the composite material behaves in a brittle manner. This will be true for any brittle material containing small unconnected ductile particles.

Conversely, if a composite material is made up largely from a ductile material (such as steel), in which small spheroidal particles of brittle material (such as ceramic) are embedded, the composite material will not exhibit the desirable high temperature properties of the brittle (ceramic) material, i.e., it will have too much plastic deformation at high temperatures.

Some researchers are presently attempting to develop new elevated-temperature materials by achieving room-temperature ductility in certain refractory materials, such as ceramics. It is possible that this approach may have merit, although it appears that the achievement of room-temperature ductility will automatically preclude elevated-temperature strength. In any event, my approach to the problem is based not on achieving ductility in ceramics or "brittle" materials, but rather is the converse, the achieving of a deformation-controlling mechanism, or greater "brittleness" at elevated temperatures, of metals or metal-loys possessing room-temperature ductility.

Bearing in mind the foregoing facts, it is a major object of my invention to provide a novel material which contains a significant amount of ductile materials and which will maintain its strength at temperatures well above 2000° F., e.g. 3000° F. or higher, as well as possessing sufficient room-temperature ductility to prevent brittle fracture and low impact strength.

It is another object of my invention to provide a novel composite material which comprises a matrix of material possessing room-temperature ductility, said material being modified by introducing into said matrix dissimilar materials in a specific type of geometric configuration, whereby the novel material retains room-temperature ductility while possessing strength at high temperature, as well as possessing high impact strength, and other advantageous properties.

It is well known to those skilled in the art that under certain conditions extremely fine filaments of glass, metal, and other materials exhibit tensile stresses of extremely high values. For example, stresses in excess of 5 million p.s.i. have been reported in silica filaments of 3 micron diameter. Further, extremely high stresses have also been attained in other geometric forms, such as ribbons or films, when the thickness of such ribbons and films was of micron magnitude. For example, ultimate tensile stresses in excess of 1 million p.s.i. have been reported in glass ribbons, in flakes of mica, and in films of silver.

Still further, in some cases creep rates of the micron-size filaments or films are several orders of magnitude less than creep rates found in conventionally-sized specimens of the same material. These lowered creep rates indicate increased high-temperature strength associated with the micron size.

It is therefore another object of this invention to utilize the extremely high strengths and low creep rates of micron-size filaments, and other configurations having an exceedingly high ratio of surface area to volume, in a composite arrangement with normally-ductile structural materials for the purpose of increasing the strength of such ductile materials at high temperatures of operation.

Still another object of the present invention is to provide novel composite materials having specific geometric configurations comprising a more ductile material together with filaments or laminates of nonmetallic refractory materials, or metallic refractory materials, to thereby significantly increase the usable temperature of operation of the more ductile material.

These and other objects of my invention will become clearly understood by referring to the following description, and to the accompanying drawings, in which:

FIGURE 1 is a fragmentary perspective view, in side elevation, of one embodiment of my invention;

FIGURE 2 is a top plan view, in cross section, of the embodiment of my invention shown in FIGURE 1;

FIGURE 3 is a fragmentary perspective view, in side elevation, of another embodiment of my invention;

FIGURE 4 is a top plan view, in cross section, of the embodiment of my invention shown in FIGURE 3;

FIGURE 5 is a distribution curve showing filament density variation across the cross section of the embodiment shown in FIGURE 4;

FIGURE 6 is a side elevational view, in cross section, of a turbine blade, employing my invention; and FIGURE 7 is a perspective view of a third embodiment of my invention.

In general, the extremely outstanding properties of materials having a large ratio of surface area to volume, as in micron-size filaments and micron-size films or laminar materials, appears intimately bound up with surface effects of the material. And, my invention is primarily concerned with the design of special composite material incorporating such micron-size elements in a manner that these surface effects may assert themselves, and thereby impart to the composition material desired behavior characteristics such as elevated-temperature strength, for example.

FIGURES 1 and 2 show one structural design for utilizing the surface effects of micron-sized elements in order to decrease creep at elevated temperature while achieving, in the composite material, sufficient ductility at room temperatures. By the term micron-size filaments, I mean filaments whose diameter is of the order of 1 to 100 microns.

Referring now specifically to FIGURES 1 and 2, a rod 10 of the composite material of my invention is there shown. The enveloping portion or matrix 12 of my composite structure is made of a ductile metal material, or metal alloy material. The filaments 14 extend axially through the metal matrix 12, and are made of a dissimilar material, preferably a non-metallic refractory material, or a metallic refractory material. As noted in FIGURES 1 and 2, the filaments are evenly spaced throughout the metal matrix 12.

Ordinarily, if a ductile metal material were used alone, in elevated temperature environments (e.g. 3000° F.) it would tend to creep, deform, and soon lose its strength. An example of such a ductile material is stainless steel. However, in the embodiment shown in FIGURES 1 and 2, if the metal matrix 12 is stainless steel and is modified by micron-size filaments extending along the axis of the rod 10, in the direction of the stresses applied to the composite material, the filaments being of refractory material, such as tungsten, or alumina, the hot strength of the composite material will increase significantly, and its useful life greatly extended.

It will be appreciated that a ductile metal matrix is employed as the body of the material, inasmuch as its ductility will control the ductility of the composite at lower temperatures. As the higher temperatures or operation are encountered, the ordinary ductility of the matrix material becomes of secondary importance because the load on the composite material is effectively taken up by the filaments. The filaments, which retain their hot strength, effectively prevent inelastic deformation of the matrix, and of the composite.

The filaments 14 are of about 5 microns in diameter, and preferably run the length of the rod 10, the micron diameter being variable within substantial limits. The filaments preferably occupy from 10% to about 70% of the total area of the rod 10, although the total percentage of filament occupation may vary greatly depending upon the degree of creep resistance desired, and other factors.

As mentioned, a large ratio of surface area to volume of the filaments 14 brings surface effects into play, the usual results of which are to greatly increase the tensile strength and greatly reduce the creep rate. It will be noted that the elements 14 are of extremely small dimension in two directions. Micron-thickness liminar elements can also be employed even though they have only one dimension of micron size.

It will be recalled that ductile material failure is precipitated by inelastic slip or sliding action of the material, and it is also observed that in micron filaments of such materials, exhibiting ultimate stresses in the million p.s.i. range, little or no creep or inelastic deformation usually precedes failure. When "ductile" materials such as aluminum are made of micron filament or micron-film size, it thus appears that surface effects coming into play delay or inhibit inelastic flow of the material, thereby rendering the material more resistant to ductile failure (and thereby more brittle), both at room temperature and elevated temperature.

In order to improve the strength in brittle materials, such as alumina or tungsten carbide, the necessity for inhibiting or delaying plastic flow is not required to nearly the same extent, if at all, as for ductile materials, since these materials possess inherent high resistance to plastic flow. Since it is found that micron filaments and films often exhibit extremely great strengthening over the conventional sizes (e.g. ½" or 1") both at room temperature and elevated temperatures, this means that the resistance to brittle fracture has been greatly increased in these cases.

So far as ductile materials are concerned, a theory has been recently advanced to explain the increased strength, and decreased creep rate at elevated temperatures. This theory notes that in order for slip to occur, a certain number of atoms at the surface of the material must be broken apart at the level of their cohesive stress, which, of course, is extremely high. The smaller the size of the filament, the greater the ratio of surface area to volume, and the greater the number of atoms per volume that must be parted at their cohesive stress in order for slip to commence. This theory is substantiated, to some extent, by the observation of the hyperbolic variation of critical shear stress with diameter, for several different materials.

With regard to the increase in strength of fine filaments of brittle materials, it is hypothesized that filaments do not have surface cracks usually thought to be associated with larger specimens, and which are believed to be responsible for the lowering of the theoretically-attainable strength. Ordinarily, the production of filaments is by a drawing procedure wherein a large amount of viscous flow occurs. The result is the production of a very regular surface, relatively free of cracks or discontinuities that could be the source of stress concentration, and failure.

The production of the extremely strong micron-size filamentary single crystals (commonly termed whiskers) is by atomic growth in a very orderly fashion, which again tends to produce a relatively flawless surface.

Thus, with respect to both ductile and brittle materials in composite structures, if micron sizes of these materials are used so as to bring about large surface-area to volume relationships, significantly marked increases in strength occur at elevated temperatures, and marked decreases in creep rates at elevated temperatures. The production of very regular surfaces also enhances the resultant effects.

It will thus be noted that my invention broadly includes the use of micron thicknesses of both dissimilar ductile metals and brittle materials, since they both provide creep-inhibiting properties to a metal matrix. However, the use of brittle filaments is preferred. My invention also broadly includes the use of filaments and films of the extremely-orderly single crystal atomic arrangement and the use of filaments and films of the "glassy state" or disordered atomic arrangement since the beneficial surface/size effects have been observed in both arrangements.

Referring again to FIGURES 1 and 2, the filaments 14 are designed to traverse the length of the matrix 12 if the material is undergoing axial tensile stresses. It is preferable that the filaments traverse the entire load path through the component, rather than being composed of filaments substantially shorter than the total load path through the component—otherwise the matrix will necessarily have to take up some load, and some creep will result.

It is possible that inelastic flow in the rod 10 could be inhibited to such an extent, if the density of the filaments were sufficiently great, that rod 10 would behave in a brittle manner under impact stresses or thermal shock. In order to improve the impact strength (resistance to fast fracture under rapidly-applied loads), and resistance to thermal shock, an area of easy slip is provided near the surface of the rod 10 where it will have the greatest effect in increasing impact strength.

Referring particularly to FIGURES 3 and 4, this area of easy slip is achieved by tapering the distribution of filaments 14a across the cross section of the matrix 12a, of rod 10a. The distribution is of the type shown in FIGURE 5, the filaments being more dense in the central region, and less dense in the outermost region, although it will be realized that FIGURE 5 is representative of only one of a large possible number of distribution curves, in which there is an outward tapering of filament density.

Referring now particularly to FIGURE 6, a turbine blade 20 is shown having a normal or conventional external configuration but having a multiplicity of filaments of a brittle material, such as alumina, embedded in a more ductile matrix 24, such as stainless steel or the customary turbine metal alloys. The density of the alumina filaments 22 (which are of approximately 10 micron thickness) tapers from a maximum in the central portion to zero at the outer surface to meet impact strength requirements.

In a further refinement of the turbine blade 20 which is subjected to tension, it is desirable to have the filaments 22 placed in tension as the temperature is increased. This then places the matrix material 24 in compression, and thereby cancels out a certain amount of externally-applied tension stress and strain in the matrix. To achieve this phenomenon the differential expansion of the filament and matrix materials are carefully chosen. For example, the filaments 22 of alumina in the matrix 24 of stainless steel accomplishes this result. Assuming 40% $Al_2O_3$ by volume, an increase of 1000° F. in temperature places a tension stress of 76,000 p.s.i. in the filaments 22, and a compression stress of 50,000 p.s.i. in the matrix 24 (assuming elastic action and a zero stress in both elements to begin with).

The particular tension-compression design just described is not dependent upon the tapering density of the filaments. Rather, it exists because of the choice of filament and matrix materials, the filament material having a smaller thermal expansion coefficient than the matrix material.

The principle of uniform and tapering filament density has been described with reference to slender metal rods. The same principle is applicable to sheets of material, tubes, bars, and other simple and complex geometric shapes. For example, referring to FIGURE 7, micron-size filaments 32 are shown reinforcing a matrix 34 of ductile sheet material, the filaments running in two directions, perpendicular to each other. The filaments 32 are shown having a tapering density, although a uniform filament density may also be employed.

The micron-size filaments are also employed in reinforcing metal tubes operating at high temperature and pressure, as in nuclear heat exchangers, for example. It is desirable in this case to orient the filaments in a double helix arrangement to better withstand the internal stresses.

Also, filaments may be employed to advantage in cases where protective refractory coatings are required. As noted previously, a composite material having filaments in tension, and matrix in compression has significant advantages in situations where the tensile stresses are predominant. The compressive strain in the matrix is believed to have a beneficial effect on the behavior of a "brittle" coating applied to the matrix, since it tends to counteract tension stresses in the coating.

In preparing any of the filament-reinforced structures, above described, or any filament-reinforced composite material, the following method of production may be employed.

The filaments of the specified material are produced by a method siutable to the particular material, such as by drawing the specified material through a die, by extrusion through a die, or by being grown in "whisker" form.

The filaments are then combined with the matrix by a method suitable for the particular composite, such as (1) Coating the filaments with the desired thickness of matrix material and then compacting and sintering the coated filaments into the desired shape. (A tapered distribution of filament spacing can be produced by using varying thicknesses of coating on the filaments.) Coating may be accomplished by drawing the filament through a melt of matrix material, by electrodeposition, or by vapor deposition.

(2) Placing the filaments in a die of proper shape, where the die provides for the desired distribution of filaments, and then placing powdered or liquid metal in the die and fusing to form the composite structure.

In either case, it may be desirable to first coat the filaments with a third material, an interlayer between the filament and the coating of matrix material, in order to obtain the best possible bonding between the filament and matrix material or to prevent undesirable diffusion between the filament and matrix. This inter-layer may be applied by the methods for applying the matrix coating or by a chemical reaction at the surface of the filament obtained by putting the filament in contact with a chemical, for example, by dipping the filament into a chemical bath.

An example of the use of an inter-layer, or flux, in the case of alumina micron-size filaments in a matrix of stainless steel, would be the use of a very thin film of titanium nitride on the alumina filaments as an aid in bonding.

As mentioned, the matrix is made up of relatively ductile metals, or ductile alloys thereof. Examples of such metals are:

| | |
|---|---|
| Niobium | Cobalt |
| Magnesium | Nickel |
| Aluminum | Copper |
| Zinc | Rhenium |
| Chromium | Silver |
| Molybdenum | Gold |
| Iron | Titanium |

An alloy of a metal is defined for purposes of this application as a more or less homogeneous mixture or solution of at least 50% of the metal, with other metals or non-metals. An alloy of three or more metals may of course contain less than 50% of any of the constituents.

Tungsten, beryllium and graphite are not included within the clasification of metals for purposes of this application. Rather, they are here classified as refractory materials, and thus included within the category of ceramics and other materials utilized for the filament materials. Ceramic materials are defined for the purposes of this application as non-metallic inorganic materials. The ceramic materials thus include carbides, cemented carbides, nitrides, silicides, oxides, borides and silicates. Typical ceramic materials are alumina ($Al_2O_3$), beryllia (BeO), magnesia (MgO), building brick, forsterite ($MgSiO_4$), mullite porcelain, steatite porcelain, zircon porcelain, and sewer pipe (vitrified clay). Other specific examples include:

Carbides of—
| | |
|---|---|
| Hafnium | HfC |
| Tantalum | TaC |
| Zirconium | ZrC |
| Niobium | NbC |
| Titanium | TiC |
| Tungsten | WC |
| Vanadium | VC |
| Aluminum | $Al_4C_3$ |
| Molybdenum | $Mo_2C$ |
| Thorium | $ThC_2$ |
| Boron | $B_4C$ |
| Uranium | $UC_2$ |
| Calcium | $CaC_2$ |
| Silicon | SiC (B) |
| Beryllium | $Be_2C$ |
| Chromium | $Cr_3C_2$ |
| Iron | $Fe_3C$ |

Oxides of—
| | |
|---|---|
| Thorium | $ThO_2$ |
| Hafnium | $HfO_2$ |
| Magnesium | MgO |
| Zirconium | $ZrO_2$ |
| Cerium | $CeO_2$ |
| Calcium | CaO |
| Beryllium | BeO |
| Gadolinium | $Gd_2O_3$ |
| Uranium | $UO_2$ |
| Titanium | $Ti_2O_3$ |
| Aluminum | $Al_2O_3$ |
| Titanium | $TiO_2$ |
| Silicon | $SiO_2$ |

Silicides of—
| | |
|---|---|
| Tantalum | $TaSi_2$ |
| Tungsten | $WSi_2$ |
| Molybdenum | $MoSi_2$ |
| Niobium | $NbSi_2$ |

Borides of—
| | |
|---|---|
| Zirconium | $ZrB_2$ |
| Tantalum | $TaB_2$ |
| Tungsten | $WB_2$ |
| Niobium | $NbB_2$ |
| Titanium | $TiB_2$ |
| Uranium | $UB_2$ |
| Calcium | $CaB_6$ |
| Lanthanum | $LaB_6$ |

Nitrides of—
| | |
|---|---|
| Tantalum | TaN |
| Boron | BN |
| Zirconium | ZrN |
| Titanium | TiN |
| Niobium | NbN |
| Vanadium | VN |
| Silicon | $Si_3N_4$ |

Other specific examples follow:

EXAMPLE 1

*Aluminum-Oxide Filaments in Stainless Steel Matrix*

Aluminum-oxide filaments of 5–10 micron diameter would be produced by extruding from a melt through a die (with extremely rapid cooling from a cold air jet), by growing in continuous "whisker" form, or by other suitable means. (It may be desirable to run the filament through a subsequent heat-treatment to provide the best crystalline arrangement of atoms.) The filaments are then dusted lightly with titanium nitride powder and then dipped in a melt of stainless steel and drawn through a die to remove excess metal and to size the coating.

The coated filaments are then placed in a spacing die which is then filled with liquid steel or metal powder, and in the case of liquid steel is allowed to cool, or in the case of powder, is sintered in vacuum. Subsequent heat treatment of the composite is employed to produce the desired metallurgical structure in the metal matrix.

It may further be desirable to roll or extrude the resulting composite, with a small reduction in area, to produce a beneficial residual tension stress in the filaments.

EXAMPLE 2

*Tungsten Filaments in Molybdenum Matrix*

The tungsten filaments may be produced by techniques now employed by tungsten manufacturers to make extremely fine filaments, or they may be grown in "whisker" form.

The filaments should be placed in a spacing die, surrounded by molybdenum powder and vacuum sintered and possibly hot rolled. Subsequent heat-treatment could be employed if desired.

EXAMPLE 3

*Graphite Filament in Niobium Matrix*

Graphite filaments are formed by pyrolizing organic filaments or by growing in "whisker" form from an electric arc or vapor deposition.

The filaments are placed in a spacing die, surrounded by powdered niobium which is then sintered and perhaps hot rolled. A chemical reaction takes place to form niobium carbide filaments in place of graphite filaments, niobium carbide being a good refractory ceramic for the purpose of providing hot strength.

While several embodiments of my invention are disclosed herein, it will be understood that they are merely representative. To those skilled in the art, various changes and modifications may be suggested by this disclosure, which lie within the scope of the invention. For

I claim:

A turbine blade, which comprises: a ductile metal matrix, the metal being selected from the group consisting of niobium, magnesium, aluminum, zinc, chromium, molybdenum, iron, cobalt, nickel, copper, rhenium, silver, gold, and titanium, and a multiplicity of spaced micron-sized elongated filaments of ceramic material, embedded within said matrix, said filaments of material having a diameter of less than about 10 microns, the material of said matrix having a thermal expansion greater than the thermal expansion of said filaments whereby to place said matrix in compression and said filaments in tension, as the temperature of the composite material increases, said filaments extending in the direction generally coincident with the direction of stress to which the turbine blade is subjected, and extending the length of approximately the entire load path of the stress.

References Cited in the file of this patent
UNITED STATES PATENTS

| | | |
|---|---|---|
| 2,616,165 | Brennan | Nov. 4, 1952 |
| 2,699,415 | Nachtman | Jan. 11, 1955 |
| 2,719,095 | Scanlan | Sept. 27, 1955 |
| 2,729,028 | Slayter | Jan. 3, 1956 |
| 2,814,162 | Toulmin | Nov. 26, 1957 |
| 2,829,427 | Tacvorian | Apr. 8, 1958 |
| 2,843,646 | Conant | July 15, 1958 |
| 2,915,806 | Grant | Dec. 8, 1959 |
| 2,930,105 | Budd | Mar. 19, 1960 |
| 2,953,849 | Morgan | Sept. 27, 1960 |
| 2,985,803 | Brennan | May 23, 1961 |